(12) United States Patent
Chakraborty et al.

(10) Patent No.: US 11,147,099 B2
(45) Date of Patent: Oct. 12, 2021

(54) INDICATION USING CROSS CARRIER SIGNALING IN A WIRELESS COMMUNICATIONS NETWORK

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/654,655

(22) Filed: Oct. 16, 2019

(65) Prior Publication Data

US 2020/0128581 A1 Apr. 23, 2020

Related U.S. Application Data

(60) Provisional application No. 62/747,948, filed on Oct. 19, 2018.

(51) Int. Cl.
*H04W 74/00* (2009.01)
*H04W 72/08* (2009.01)
*H04W 72/04* (2009.01)
*H04L 5/00* (2006.01)
*H04W 72/12* (2009.01)

(52) U.S. Cl.
CPC ........ *H04W 74/006* (2013.01); *H04L 5/0032* (2013.01); *H04L 5/0048* (2013.01); *H04W 72/044* (2013.01); *H04W 72/085* (2013.01); *H04W 72/121* (2013.01)

(58) Field of Classification Search
CPC ............. H04W 72/0446; H04W 88/08; H04W 72/0453; H04W 24/00; H04L 5/0007
USPC ......................................................... 370/330
See application file for complete search history.

(56) References Cited

U.S. PATENT DOCUMENTS

| 8,369,280 B2 * | 2/2013 | Dinan | ............... H04W 72/0453 370/330 |
| 2014/0003387 A1 * | 1/2014 | Lee | ....................... H04L 5/0096 370/330 |

(Continued)

OTHER PUBLICATIONS

3GPP TSG RAN WG1 Meeting #94, Gothenburg, Sweden, Aug. 20-24, 2018, R1-1808272, Agenda item: 7.2.2.3.1, Title: On downlink transmission detection in NR-U, Source: MediaTek Inc. (Year: 2018).*

(Continued)

*Primary Examiner* — Peter G Solinsky
*Assistant Examiner* — Sanjay K Dewan
(74) *Attorney, Agent, or Firm* — Liem T. Do

(57) ABSTRACT

Wireless communications systems and methods related to communications in a network are provided. A first wireless communication device communicates, with a second wireless communication device in a first frequency band, a first downlink (DL) communication signal indicating information associated with a transmission opportunity (TXOP) in a second frequency band different from the first frequency band. The first wireless communication device communicates, with the second wireless communication device in the second frequency band based on the first DL communication signal, a second DL communication signal during the TXOP.

30 Claims, 13 Drawing Sheets

1300

(56) References Cited

U.S. PATENT DOCUMENTS

| | | | | |
|---|---|---|---|---|
| 2015/0382374 | A1* | 12/2015 | Bhorkar | H04W 72/0446 370/330 |
| 2016/0143014 | A1* | 5/2016 | Mukherjee | H04L 5/0039 370/330 |
| 2016/0174259 | A1* | 6/2016 | Mukherjee | H04L 1/1816 370/280 |
| 2017/0063479 | A1* | 3/2017 | Kim | H04W 24/10 |
| 2017/0111217 | A1* | 4/2017 | Kim | H04L 41/08 |
| 2018/0279211 | A1* | 9/2018 | Lunttila | H04L 1/1887 |

OTHER PUBLICATIONS

3GPP TSG RAN WG1 Meeting #94bis, Chengdu, China, Oct. 8-12, 2018, R1-1810955, Source: OPPO, Title: Frame Structure for NR-U, Agenda item: 7.2.2.2. (Year: 2018).*

International Search Report and Written Opinion—PCT/US2019/056796—ISA/EPO—dated Jan. 20, 2020.

Mediatek Inc: "On Downlink Transmission Detection in NR-U", 3GPP Draft, R1-1808272 on Downlink Transmission Detection in NR-U, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515656, 112 pages, Retrieved from the Internet: URL: http://www.3gpp.org/ftp/tsg%5Fran/WG1%5FRL1/TSGR1%5F94/Docs/R1%2D1808272%2Ezip. [retrieved on Aug. 11, 2018] paragraph [0004].

OPPO: "Frame structure for NR-U", 3GPP Draft, R1-1810955, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518360, 4 pages, Retrieved from the Internet: URL: http://www.3gpp.org/ftp/tsg%5Fran/WG1%5FRL1/TSGR1%5F94b/Docs/R1%2D1810955%2Ezip. [retrieved on Sep. 29, 2018], paragraph [03.3].

* cited by examiner

INDICATION USING CROSS CARRIER SIGNALING IN A WIRELESS COMMUNICATIONS NETWORK

CROSS REFERENCE TO RELATED APPLICATIONS & PRIORITY CLAIM

The present application claims priority to and the benefit of U.S. Provisional Patent Application No. 62/747,948 filed Oct. 19, 2018 entitled "Indication Using Licensed Supplemental Downlink Paired with Primary Component Carrier," which is incorporated by reference in its entirety herein.

TECHNICAL FIELD

This application relates to wireless communication systems, and more particularly to communications in a network deployed over a licensed supplemental downlink (SDL) paired with a primary component carrier.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR operating entities that may not have access to a licensed spectrum.

NR-unlicensed (NR-U) may refer to the deployment of a NR cell in an unlicensed spectrum. For example, a NR cell may be deployed in a standalone NR-U mode over one or more unlicensed frequency bands. NR-U may also support cell deployments using various combinations of unlicensed bands and licensed bands. For example, a NR cell may be deployed using carrier aggregation to combine a NR licensed band with a NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, a NR cell may be deployed using dual connectivity between an LTE licensed band and a NR unlicensed band, where the LTE licensed band may function as a PCell and the NR unlicensed band may function as a SCell. In yet another example, a NR cell may be deployed in a DL unlicensed band and a UL licensed band.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device in a first frequency band, a first downlink (DL) communication signal indicating information associated with a transmission opportunity (TXOP) in a second frequency band different from the first frequency band; and communicating, by the first wireless communication device with the second wireless communication device in the second frequency band based on the first DL communication signal, a second DL communication signal during the TXOP.

In an additional aspect of the disclosure, an apparatus includes a transceiver configured to communicate, by a first wireless communication device with a second wireless communication device in a first frequency band, a first DL communication signal indicating information associated with a TXOP in a second frequency band different from the first frequency band; and further configured to communicate, by the first wireless communication device with the second wireless communication device in the second frequency band based on the first DL communication signal, a second DL communication signal during the TXOP.

In an additional aspect of the disclosure, a computer-readable medium includes program code recorded thereon, the program code including code for causing a first wireless communication device to communicate, with a second wireless communication device in a first frequency band, a first DL communication signal indicating information associated with a TXOP in a second frequency band different from the first frequency band; and code for causing the first wireless communication device to communicate, with the second wireless communication device in the second frequency band based on the first DL communication signal, a second DL communication signal during the TXOP.

In an additional aspect of the disclosure, an apparatus includes means for communicating, with a second wireless communication device in a first frequency band, a first DL communication signal indicating information associated with a TXOP in a second frequency band different from the first frequency band; and means for communicating, with the second wireless communication device in the second frequency band based on the first DL communication signal, a second DL communication signal during the TXOP.

In an aspect of the disclosure, a method of wireless communication includes communicating, by a first wireless communication device with a second wireless communication device in a first frequency band, a first communication signal indicating a transmission configuration for at least one of a reference signal or a network information signal in a second frequency band different from the first frequency band; and communicating, by the first wireless communication device with the second wireless communication device in the second frequency band based on the first communication signal, the at least one of the reference signal or the network information signal.

In an additional aspect of the disclosure, an apparatus includes a transceiver configured to communicate, by a first wireless communication device with a second wireless communication device in a first frequency band, a first communication signal indicating a transmission configuration for at least one of a reference signal or a network information signal in a second frequency band different from the first frequency band; and further configured to communicate, by the first wireless communication device with the second wireless communication device in the second frequency band based on the first communication signal, the at least one of the reference signal or the network information signal.

In an additional aspect of the disclosure, a computer-readable medium includes program code recorded thereon, the program code including code for causing a first wireless communication device to communicate, with a second wireless communication device in a first frequency band, a first communication signal indicating a transmission configuration for at least one of a reference signal or a network information signal in a second frequency band different from the first frequency band; and code for causing the first wireless communication device to communicate, with the second wireless communication device in the second frequency band based on the first communication signal, the at least one of the reference signal or the network information signal.

In an additional aspect of the disclosure, an apparatus includes means for communicating, with a second wireless communication device in a first frequency band, a first communication signal indicating a transmission configuration for at least one of a reference signal or a network information signal in a second frequency band different from the first frequency band; and means for communicating, with the second wireless communication device in the second frequency band based on the first communication signal, the at least one of the reference signal or the network information signal.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
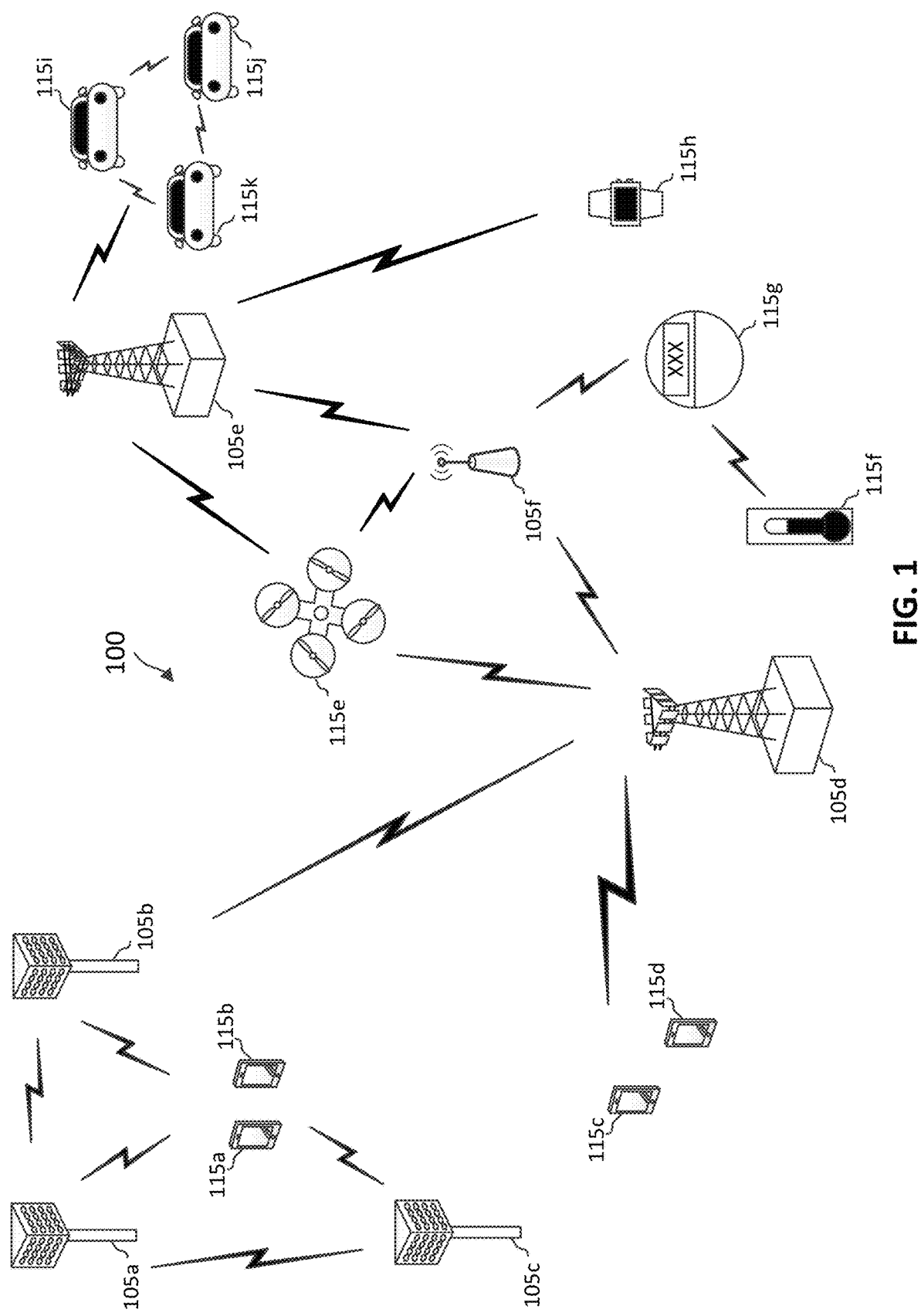
FIG. 1 illustrates a wireless communication network according to one or more embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present application describes mechanisms for improving communications between wireless devices by utilizing a supplemental DL licensed band paired with a primary component carrier. In some examples, the primary component carrier operates in unlicensed UL band and/or unlicensed DL band. The licensed band may be used to provide more efficient operation in communications between communication devices and may be leveraged to benefit the operation in the unlicensed UL and/or DL operation.

In an embodiment, the network 100 may operate over shared frequency bands or unlicensed frequency bands, for example, at about 3.5 gigahertz (GHz), sub-6 GHz or higher frequencies in the mmWave band. Operations in unlicensed spectrum may include DL transmissions and/or UL transmissions. In an example, a device (e.g., BS or UE) operating in a shared or unlicensed frequency spectrum may perform a listen-before-talk (LBT) procedure (e.g., clear channel assessment (CCA)) prior to communicating to determine whether the channel is available. If the channel is available, the BS checks out the channel and performs a DL transmission in the channel. If the channel is not available, the BS may back off and perform the LBT procedure again at a later point in time. Additionally, the BS may operate in a licensed frequency band. It is unnecessary for the BS to contend for access to the channel for the licensed frequency band.

The BS may contend for a transmission opportunity (TXOP) in the unlicensed frequency band. Upon gaining a TXOP in the unlicensed frequency band, the BS may use the licensed frequency band to transmit additional information associated with the TXOP in the unlicensed frequency band. The information may provide the UE with an indication that allows the UE to more easily locate the TXOP in the unlicensed frequency band and/or locate signals (e.g., reference signals or network information signals) transmitted by the BS in the unlicensed frequency band. Additionally, the BS may transmit in a first frequency band a transmission configuration for a reference signal or a network information signal to the UE and further transmit in a second frequency band the reference signal or a network information signal to the UE. The transmission configuration may allow the UE to more easily locate the reference signals or the network information signals transmitted by the BS. In some examples, the UE may measure the reference signals or the network information signals transmitted in the second frequency band and send the measurement reports to the BS.

FIG. 1 illustrates a wireless communications network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively s geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, the network 100 may be a NR network deployed over a licensed spectrum and/or an unlicensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a shared frequency band or an unlicensed frequency band, for example, at about 3.5 gigahertz (GHz), sub-6 GHz or higher frequencies in the mmWave band. Operations in unlicensed spectrum may include DL transmissions and/or UL transmissions. The network 100 may partition a frequency band into multiple channels or subbands, for example, each occupying about 20 megahertz (MHz).

The BSs 105 and the UEs 115 may be operated by multiple network operating entities sharing resources in the shared or unlicensed frequency spectrum and may perform a LBT procedure (e.g., clear channel assessment (CCA)) prior to communicating to determine whether the channel is available. In an example, the BS 105 may employ a LBT procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. The BS 105 may perform a LBT in the frequency band prior to transmitting in the frequency band and may transmit in one or more channels based on the LBT result. If the channel is available (performance of the LBT results in a LBT pass), the BS 105 may perform a DL transmission, receive a UL transmission from a UE 115, and/or schedule a UE 115 for data transmission and/or reception within a TXOP. If the channel is not available (performance of the LBT results in a LBT fail), the BS 105 may back off and perform the LBT procedure again at a later point in time. Additionally, the BS may operate in a licensed frequency band, without contending for access to the medium. Accordingly, the BS's access to the licensed frequency band may be more consistent and certain relative to accessing the unlicensed frequency band. It may be advantageous for the BS 105 to use both the licensed frequency band and unlicensed frequency band for DL transmissions to and/or UL transmissions from the UE 115.

Figure 2:
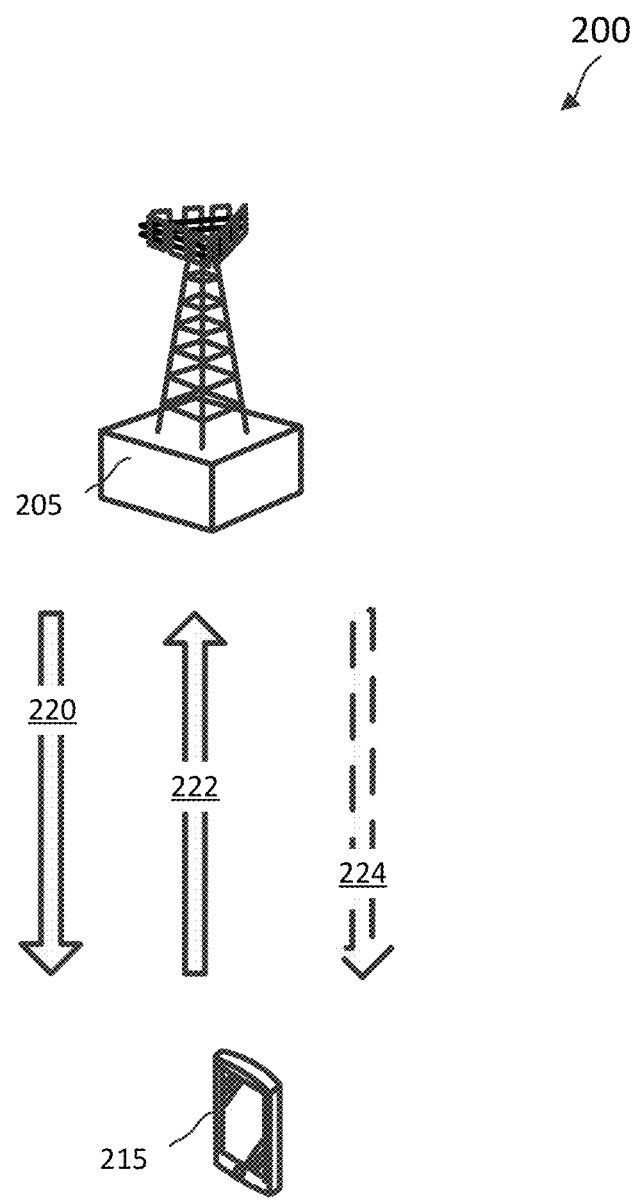
FIG. 2 illustrates a wireless communications network that supports a licensed supplemental downlink (SDL) carrier in addition to an unlicensed uplink (UL) and/or downlink (DL) carrier according to one or more embodiments of the present disclosure.

FIG. 2 illustrates a wireless communications network 200 that supports a licensed SDL carrier in addition to an unlicensed UL and/or DL carrier according to one or more embodiments of the present disclosure. FIG. 2 illustrates a BS 205 and a UE 215 for purposes of simplicity of discussion, though it will be recognized that embodiments of the present disclosure may scale to many more UEs 215 and/or BSs 205. The BS 205 and the UE 215 may be similar to the BS 105 and the UE 115, respectively. Additionally, wireless communications system 200 may operate in unlicensed spectrum that may also be used by other wireless communication devices.

Wireless communications system 200 supports DL transmissions by BS 205 when operating in unlicensed spectrum and/or licensed spectrum. In some examples, carrier aggregation may involve aggregation of a primary component carrier with a secondary component carrier for facilitation of communications between the BS 205 and the UE 215. In an example, the primary component carrier operates in the unlicensed spectrum, and the secondary component carrier operates in the licensed spectrum. In the present disclosure, the terms "non-SDL carrier," "primary DL carrier," normal DL carrier," "DL unlicensed band," and "unlicensed frequency band" may be used interchangeably. Additionally, the terms "SDL licensed band" and "licensed frequency band" may be used interchangeably.

The wireless communications system 200 supports both a DL unlicensed band 220 and a UL unlicensed band 222, which utilize unlicensed spectrum, and a SDL licensed band 224, which utilizes the licensed spectrum. In some examples, DL and UL communications may both be on the same unlicensed band (TDD). For DD systems, DL and UL may be on separate bands. It is unnecessary for the BS 205 to contend for access to the medium for the SDL licensed band 224, and the BS 105 may utilize it in addition to the available DL unlicensed band 220 for DL transmissions. The BS 205 transmits DL information in the DL unlicensed band 220 and/or the SDL licensed band 224 to the UE 215. The UE 215 receives in the SDL licensed band 224 information from the BS 205 and may use this information to assist in its reception of DL data in the DL unlicensed band 220 from the BS 105 and/or transmission of UL data in the UL unlicensed band 222 to the BS 105.

A scenario in which an operator may have the SDL licensed band 224 but not a corresponding UL licensed band may arise in the area of satellite communications. For example, operators with licensed mmWave bands used for satellite communication may re-farm or repurpose part of the licensed band for terrestrial DL operation. The satellite operators may not have access to a UL licensed spectrum because, for example, UL transmissions may not be allowed in the licensed band due to undesired interference on incumbent satellite operation. In this example, the operators may transmit from the BS 205 utilizing the SDL licensed band 224, but seek other mechanisms for UL transmissions. In such a scenario, it may be desirable to pair the use of unlicensed frequency bands and the licensed DL mmWave bands to benefit the operation in unlicensed UL and/or DL. The field of satellite communications is discussed as an example, and it should be understood that other industries and/or operators may benefit from the teachings of the disclosure. It should also be understood that although examples may describe the SDL licensed band 224 as being in the mmWave frequency band, the SDL licensed band 224 may operate in other frequency bands (e.g., at about 3.5 gigahertz (GHz) or sub-6 GHz) as well.

The SDL licensed band 224 may include additional guaranteed resources to supplement the unlicensed primary component carrier, and the additional resources may be used to notify the UE 215 of signals sent in the primary component carrier. A combination of both the DL unlicensed band 220 and the UL unlicensed band 222 may function as an anchor component carrier, providing for a non-standalone mode in NR. The anchor signals, which include synchronization signals (e.g., PSS, SSS, and SSBs) and broadcast system information (e.g., PBCH), may be transmitted in the unlicensed primary component carrier. The initial access procedures may be defined with respect to the unlicensed primary component carrier, and the UE may search in the primary component carrier for the anchor signals with guidance from the additional resources included in the SDL licensed band 224. For the non-standalone mode implementation, if the DL unlicensed band 220 is assumed to consistently be the anchor, it may be unnecessary for the SDL licensed band 224 to transmit communications to the UE for connecting with the licensed carrier. The SDL licensed band 224 may carry its own data as well as control information, which may be discussed in more detail below.

In some examples, the SDL licensed band 224 is paired with the UL unlicensed band 222 and provides a self-contained structure that operates in a standalone mode. For the standalone mode implementation, the SDL licensed band 224 (e.g., licensed mmWave band) may operate on its own without having a frequency band below 6 GHz that provides additional signaling. For both the standalone and non-standalone mode implementations, the UE may benefit from power savings by monitoring the SDL licensed band 224 (e.g., the mmWave band) when needed (e.g., for big amount of data) while staying on the primary component carrier for power savings when the licensed band is not required.

The BS 205 may leverage the licensed frequency band to benefit the operation in unlicensed UL and/or DL. For example, when operating in the licensed frequency band, the BS may schedule data transmission and/or reception on a more consistent basis utilizing the SDL licensed band 224 because it is unnecessary for the BS to contend for the licensed medium. The BS may utilize the SDL licensed band 224 on an ad hoc basis depending on whether the BS desires to include additional data in the SDL licensed band 224 (e.g., scheduling the UE for a higher BW data transmission). In some examples, the BS may leverage the SDL licensed band 224 as an indication channel or for scheduling purposes. In an example, the indication channel indicates information associated with a TXOP in the DL unlicensed band 220 and/or UL unlicensed band 222. In another example, the indication channel indicates a transmission configuration for a signal transmitted in the DL unlicensed band 220.

Figure 3:
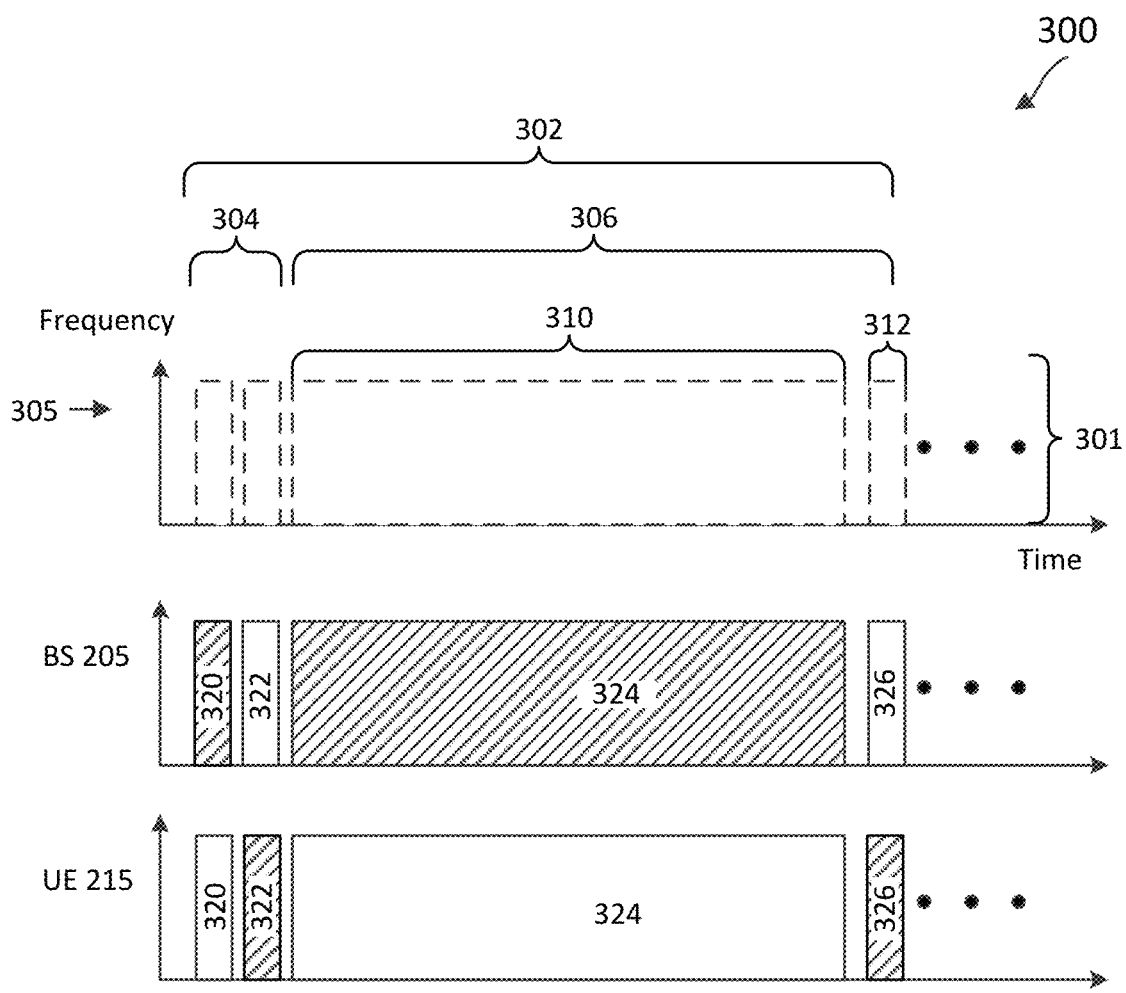
FIG. 3 illustrates a spectrum sharing scheme according to one or more embodiments of the present disclosure.

FIG. 3 illustrates a spectrum sharing scheme 300 according to one or more embodiments of the present disclosure.

The x-axis represents time in some constant units. The y-axis represents frequency in some constant units. The scheme 300 may be employed by the BSs 105 and 205 and the UEs 115 and 215. In FIG. 3, patterned boxes represent transmit signals and the empty boxes represent receive signals. The dashed boxes are included to show the transmission and/or reception with reference to the TXOP structure 305 (e.g., without signal transmission or reception).

The spectrum spans a frequency band 301 and is time-partitioned into a plurality of TXOPs 302 as shown in the TXOP structure 305. Each TXOP 302 includes a clear channel assessment (CCA) period 304 and a transmission period 306. The CCA period 304 and the transmission period 306 may have fixed durations. For example, each CCA period 304 may include one or more OFDM symbols, and each transmission period 306 may include one or more subframes. In some embodiments, the TXOPs 302 may be defined in units of LTE slots (e.g., about 250 microseconds (μs) long). The TXOP structure 305 is pre-determined and known by all network operating entities sharing the shared spectrum. The network operating entities may be time-synchronized when operating in the shared spectrum. Additionally, the transmission period 306 can be used for UL and/or DL transmissions. For example, the transmission period 306 includes two portions 310 and 312. The portion 310 can have a longer duration than the portion 312. For DL-centric communications, the portion 310 can be assigned for DL transmissions and the portion 312 can be assigned for UL transmissions. Alternatively, for UL-centric communications, both the portions 310 and 312 can be assigned for UL transmissions.

As an example, the BS 205 transmits a reservation request (RRQ) signal 320 in the CCA period 304 to reserve the following transmission period 306, for example, for a DL-centric transmission. In response, the UE 215 transmits a reservation response (RRS) signal 322 in the CCA period 304. The RRQ signal 320 can be pre-determined preambles or request-to-transmit (RTS) signals. The RRS signal 322 can be pre-determined preambles or clear-to-transmit (CTS) signals. In some embodiments, the RRQ signal 320 can include a DL transmission trigger (e.g., a DL control signal carrying DL scheduling information) and the RRS signal 322 can include a SRS. Subsequently, the BS 205 communicates with the UE 215 in the transmission period 306. The transmission period 306 may begin after the CCA period 304. The BS 205 transmits a DL data signal 324, for example, based on the DL scheduling information, in the portion 310. The UE 215 transmits a UL control signal 326, for example, carrying a scheduling request (SR) and hybrid automatic repeat request (HARQ) information. The DL signal 324 may carry DL data for the UE 215.

Figure 4:
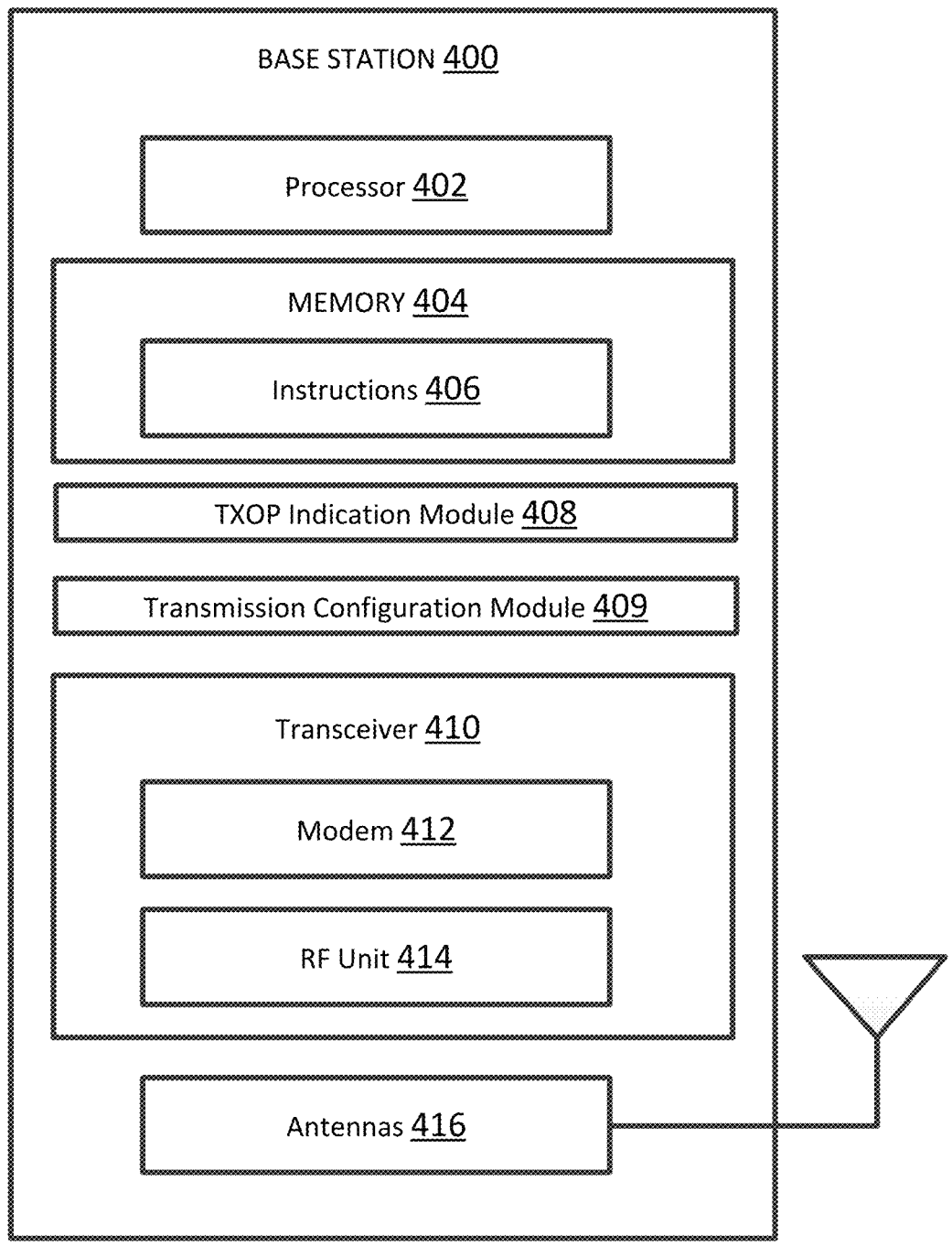
FIG. 4 is a block diagram of an exemplary base station (BS) according to one or more embodiments of the present disclosure.

FIG. 4 is a block diagram of an exemplary BS 400 according to one or more embodiments of the present disclosure. The BS 400 may be a BS 105, BS 205 as discussed above. As shown, the BS 400 may include a processor 402, a memory 404, a TXOP indication module 408, a transmission configuration module 409, a transceiver 410 including a modem subsystem 412 and a radio frequency (RF) unit 414, and one or more antennas 416. These elements may be in direct or indirect communication with each other, for example via one or more buses.

The processor 402 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the BSs 105 and 205 in connection with embodiments of the present disclosure, for example, aspects of FIGS. 3 and 6-13. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the TXOP indication module 408 and the transmission configuration module 409 may be implemented via hardware, software, or combinations thereof. For example, each of the TXOP indication module 408 and the transmission configuration module 409 may be implemented as a processor, circuit, and/or instructions 406 stored in the memory 404 and executed by the processor 402. In some examples, a BS may include one of the TXOP indication module 408 or the transmission configuration module 409. In other examples, a BS may include both the TXOP indication module 408 and the transmission configuration module 409.

The TXOP indication module 408 and the transmission configuration module 409 may be used for various aspects of the present disclosure. The TXOP indication module 408 is configured to communicate with a wireless communication device in a first frequency band, a first communication signal indicating information associated with a TXOP in a second frequency band different from the first frequency band. Additionally, the TXOP indication module 408 is configured to communicate with the wireless communication device in the second frequency band based on the first communication signal, a second communication signal during the TXOP.

Referring to FIG. 2 as an example, the TXOP indication module 408 transmits to the UE in the SDL licensed band 224, a first communication signal indicating information associated with a TXOP in the unlicensed band. The BS may perform LBT in the unlicensed band, where the information is dependent on a result of the LBT. The information may indicate, for example, at least one of a start of the TXOP, the subband channel access information for the unlicensed band, a location of one or more reference signals transmitted during the TXOP, or a location of one or more SSBs transmitted during the TXOP.

In an example, the transmission configuration module 409 is configured to communicate with the wireless communication device in a first frequency band, a first communication signal indicating a transmission configuration for at least one of a reference signal or a network information signal in a second frequency band different from the first frequency band. Additionally, the transmission configuration module 409 is configured to communicate with the wireless communication device in the second frequency band based on the first communication signal, the at least one of the reference signal or the network information signal. In an example, the transmission configuration module 409 transmits in the first frequency band, the transmission configuration for a reference signal in a second frequency band and transmits in the second frequency band the reference signal. In another example, the transmission configuration module 409 transmits in the first frequency band, the transmission configuration for a network information signal in a second frequency band and transmits in the second frequency band the network information signal.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data from the memory 404, TXOP indication module 408, and/or the transmission confirmation module 409 according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 400 to enable the BS 400 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs to sustain multiple transmission links. The RF unit 414 may configure the antennas 416.

Figure 5:
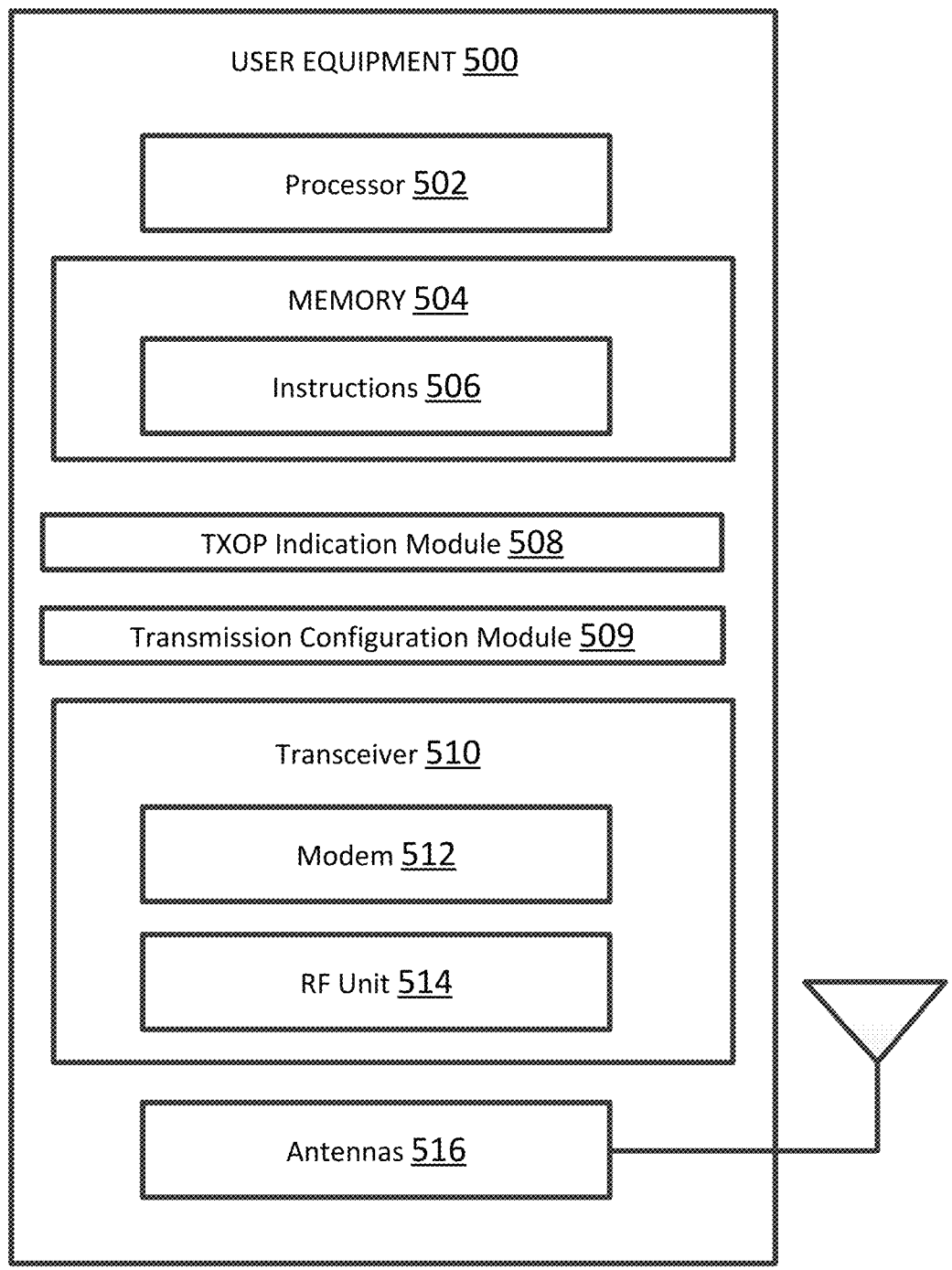
FIG. 5 is a block diagram of an exemplary user equipment (UE) according to one or more embodiments of the present disclosure.

FIG. 5 is a block diagram of an exemplary UE 500 according to one or more embodiments of the present disclosure. The UE 500 may be a UE 115, 215 as discussed above. As shown, the UE 500 may include a processor 502, a memory 504, a TXOP indication module 508, a transmission configuration module 509, a transceiver 510 including a modem subsystem 512 and a RF unit 514, and one or more antennas 516. These elements may be in direct or indirect communication with each other, for example via one or more buses.

The processor 502 may include a CPU, a DSC, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform operations described herein with reference to the UEs 115 and 215 in connection with embodiments of the present disclosure, for example, aspects of FIGS. 3 and 6-13. Instructions 506 may also be referred to as code, which may be interpreted broadly to include any type of computer-readable statement(s) as discussed above with respect to FIG. 4.

Each of the TXOP indication module 508 and the transmission configuration module 509 may be implemented via hardware, software, or combinations thereof. For example, each of the TXOP indication module 508 and the transmission configuration module 509 may be implemented as a processor, circuit, and/or instructions 506 stored in the memory 504 and executed by the processor 502. In some examples, a BS may include one of the TXOP indication module 508 or the transmission configuration module 509. In other examples, a BS may include both the TXOP indication module 508 and the transmission configuration module 509.

The TXOP indication module 508 and the transmission configuration module 509 may be used for various aspects of the present disclosure. The TXOP indication module 508 is configured to communicate with a wireless communication device in a first frequency band, a first communication signal indicating information associated with a TXOP in a second frequency band different from the first frequency band. Additionally, the TXOP indication module 508 is configured to communicate with the wireless communication device in the second frequency band based on the first communication signal, a second communication signal during the TXOP.

Referring to FIG. 2 as an example, the TXOP indication module 508 receives from the BS in the SDL licensed band 224, a first communication signal indicating information associated with a TXOP in the unlicensed band. The information may indicate, for example, at least one of a start of the TXOP, the subband channel access information for the unlicensed band, a location of one or more reference signals transmitted during the TXOP, or a location of one or more SSBs transmitted during the TXOP. Based on the information included in the first communication signal, the UE may more easily locate the TXOP or signals transmitted during the TXOP.

In an example, the transmission configuration module 509 is configured to communicate with the wireless communication device in a first frequency band, a first communication signal indicating a transmission configuration for at least one of a reference signal or a network information signal in a second frequency band different from the first frequency band. Additionally, the transmission configuration module 509 is configured to communicate with the wireless communication device in the second frequency band based on the first communication signal, the at least one of the reference signal or the network information signal. In an example, the transmission configuration module 509 receives in the first frequency band, the transmission configuration for a reference signal in a second frequency band and receives in the second frequency band the reference signal. In another example, the transmission configuration module 509 receives in the first frequency band, the transmission configuration for a network information signal in a second frequency band and receives in the second frequency band the network information signal.

As shown, the transceiver 510 may include the modem subsystem 512 and the RF unit 514. The transceiver 510 can be configured to communicate bi-directionally with other devices, such as the BSs 105 and/or another core network element. The modem subsystem 512 may be configured to modulate and/or encode the data from the memory 504, TXOP indication module 508, and/or the transmission configuration module 509 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The antennas 516 may include multiple antennas of similar or different designs in order to sustain multiple transmission links. The RF unit 514 may configure the antennas 516.

FIGS. 6-10 illustrate various mechanisms for leveraging a SDL licensed band to benefit operation in a primary frequency band according to one or more embodiments of the present disclosure. In FIGS. 6-10, the communication schemes 600, 700, 800, 900, and 1000 may be employed by BSs such as BSs 105, 205, 400 and UEs such as the UEs 115, 215, 500 in a network such as the network 100. Additionally, the x-axis represents time in some constant units, and the y-axis represents frequency in some constant units.

A UE and a BS may communicate by utilizing a SDL licensed band paired with an unlicensed band (e.g., UL and/or DL). The BS may utilize the SDL licensed band to provide information about signals in the unlicensed band to the UE. The BS performs LBT (e.g., based on energy detection and/or signal detection) in the shared channel to contend for a TXOP in the shared channel. If the LBT results in a LBT pass, the BS may schedule one or more UEs for UL and/or DL communications in the TXOP, transmit DL data to the UE, and/or receive UL data from the UE. If the LBT results in a LBT fail, the BS does not gain access to the shared medium for data scheduling or transmission. By transmitting information associated with a TXOP in the SDL licensed band rather than in the DL unlicensed band, the uncertainty related to the BS's channel access is removed and the BS may transmit the information to the UE without contending for the medium. The information provided in the SDL licensed band may assist the UE in tracking contents of a more random nature in the unlicensed primary component carrier, where the randomness may be a result of the channel access mechanism.

Figure 6:
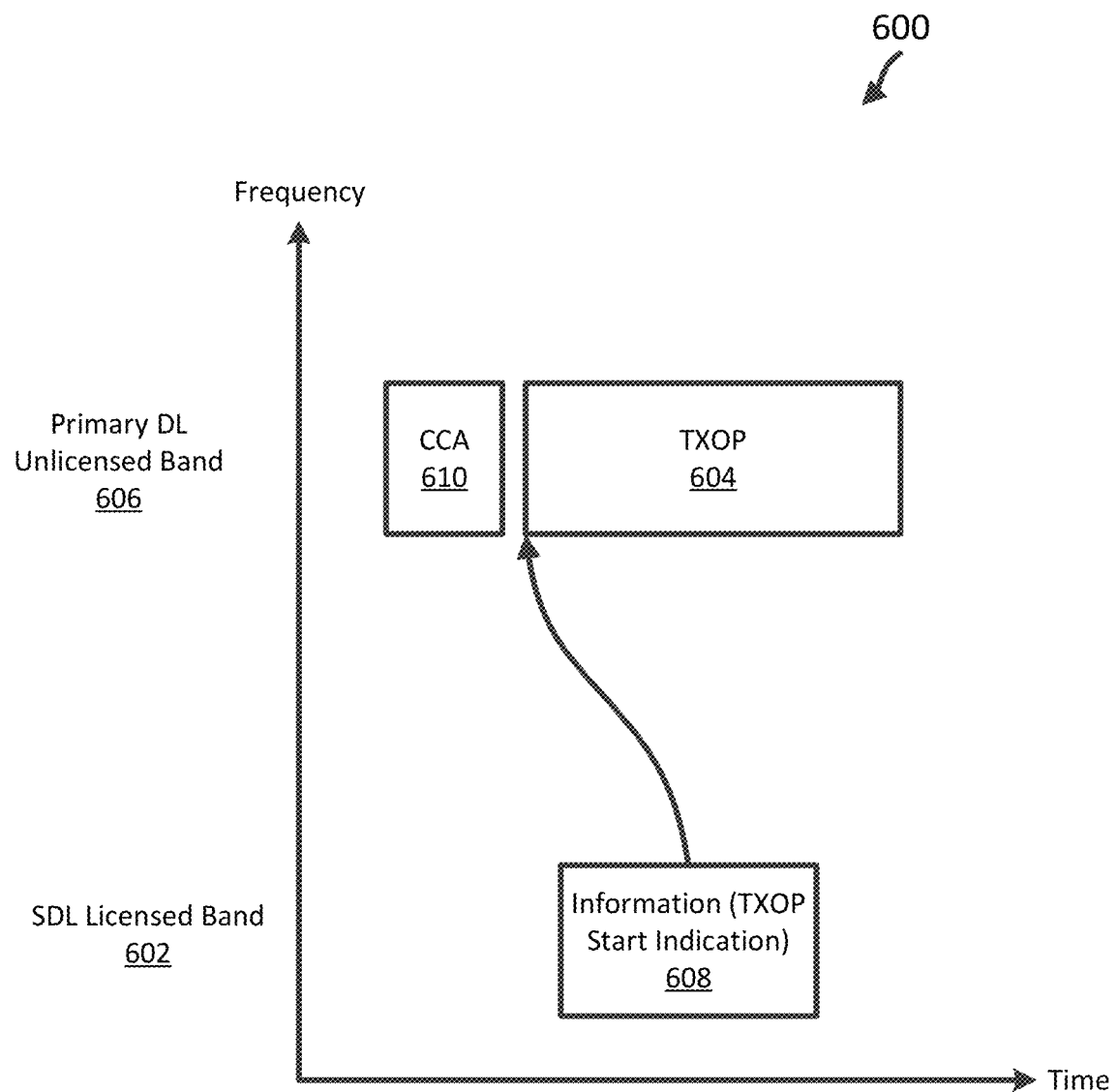
FIG. 6 illustrates a communication scheme in which the BS leverages use of a SDL licensed band for indicating a start of a transmission opportunity (TXOP) in a primary DL unlicensed band according to one or more embodiments of the present disclosure.

FIG. 6 illustrates a communication scheme 600 in which the BS leverages use of a SDL licensed band 602 for indicating a start of a TXOP 604 in a primary DL unlicensed band 606 according to one or more embodiments of the present disclosure. To transmit DL data in the primary DL unlicensed band 606, access by the BS is preceded by a CCA 610 to detect whether the BS can reserve the unlicensed medium for data transmission. The determination of whether the BS may reserve the unlicensed medium depends on various factors such as the activity in the unlicensed medium by other communication devices, transmission by higher priority network operating entities, etc. In an example, LBT is a channel access scheme that may be used in the unlicensed spectrum.

In some examples, the BS transmits in the SDL licensed band 602 to the UE, a first DL communication signal indicating information 608 associated with the TXOP 604 in the primary DL unlicensed band 606. In the example illustrated in FIG. 6, the information 608 indicates the start of the TXOP 604 for the primary DL unlicensed band 606. The BS may provision certain resources (e.g., PDCCH resources) on the SDL licensed band 602 to indicate when the TXOP 604 begins and may transmit DL control information (e.g., the information 608) to the UE via a PDCCH. Additionally, the BS transmits in the primary DL unlicensed band 606, a second DL communication signal during the TXOP 604. In an example, the BS transmits DL data via a PDSCH and/or DL control information via a PDCCH to the UE. The UE receives in the SDL licensed band 602, the information 608 and accordingly is informed of the start of the TXOP 604. Based on the information 608, the UE may know when to search in the primary DL unlicensed band 606 for the second DL communication signal transmitted by the BS during the TXOP 604. The UE receives in the primary DL unlicensed band 606 the second communication signal carrying DL data and/or DL control information from the BS.

Without the information 608 provided in the SDL licensed band 602, the UE performs a blind search in the primary DL unlicensed band 606 for the start of the TXOP 604, which depends on the outcome of the CCA 610. By utilizing the SDL licensed band 602 to transmit the information 608, the BS may provide the UE with certainty regarding when the BS can reserve the unlicensed medium. In this way, the UE's search may be simplified and the UE may consume less power. Additionally, if the SDL licensed band 602 is on the mmWave frequency band compared to the sub-6 frequency band, the SDL licensed band 602 may have a larger SCS. Accordingly, better time-domain granularity of the indication signal may be provided, and the UE may be able to pinpoint more accurately when the TXOP starts.

Figure 7:
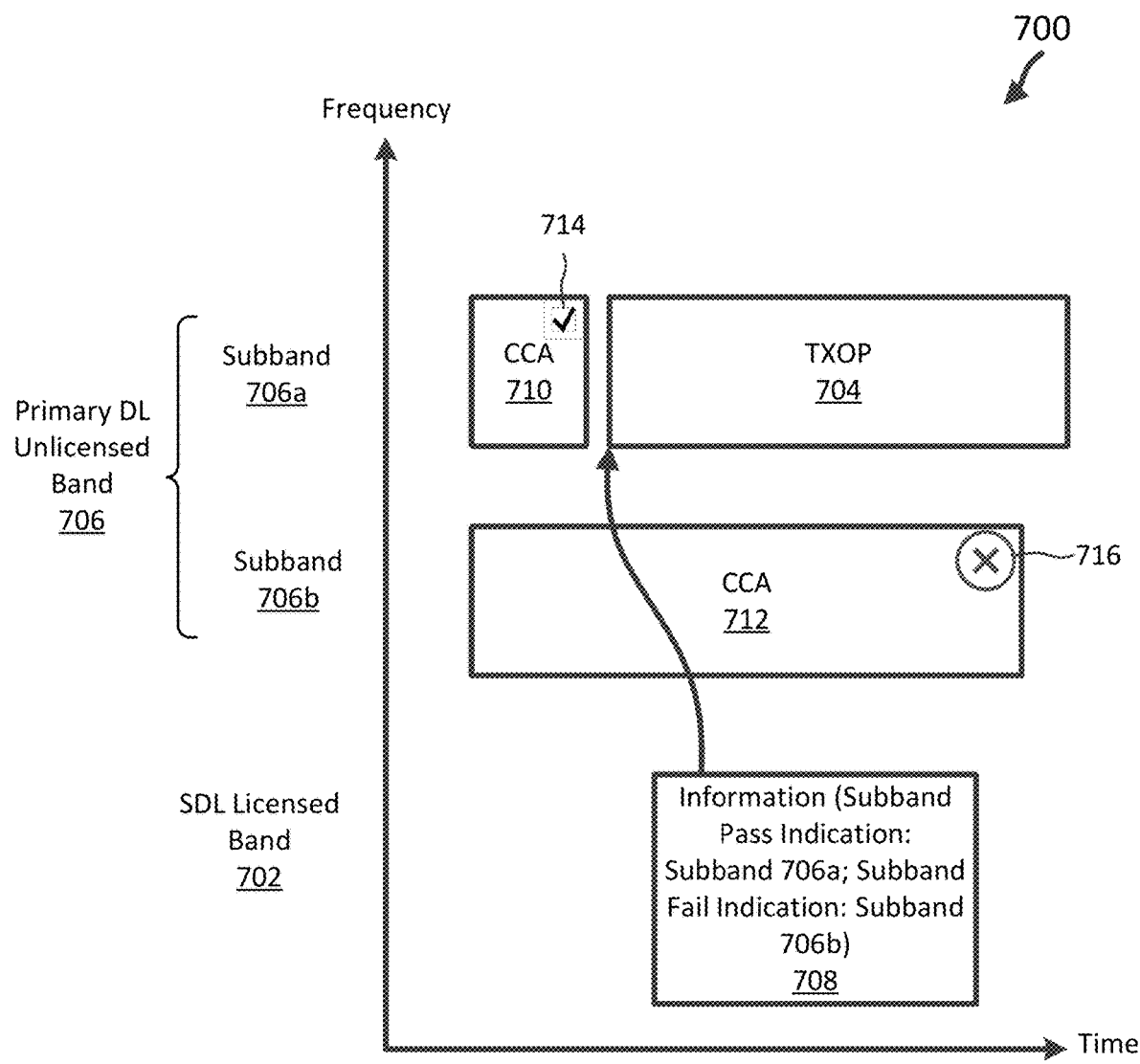
FIG. 7 illustrates a communication scheme in which the BS leverages use of the SDL licensed band for indicating results for listen-before-talk (LBT) in the primary DL unlicensed band according to one or more embodiments of the present disclosure.

FIG. 7 illustrates a communication scheme 700 in which the BS leverages use of a SDL licensed band 702 for indicating results for LBT in a primary DL unlicensed band 706 according to one or more embodiments of the present disclosure. In an example, the network 100 may partition the primary DL unlicensed band 706 into a plurality of subbands including a subband 706a and a subband 706b. Each subband may occupy, for example, about 20 MHz. The BS may contend for access to the plurality of subbands and transmit data in one or more of the subbands. To transmit DL data in the subband 706a, access by the BS is preceded by a CCA 710 to detect whether the BS can reserve the subband 706a for data transmission. Similarly, to transmit DL data in the subband 706b, access by the BS is preceded by a CCA 712 to detect whether the BS can reserve the subband 706b for data transmission. In the example illustrated in FIG. 7, the BS performs a LBT in the subband 706a and the subband 706b, and the LBT results in a LBT pass for the subband 706a and results in a LBT fail for the subband 706b. Accordingly, the BS reserves the TXOP 704 in the subband 706a as indicated by a checkmark 714 in the CCA 710, but is unable to reserve a TXOP in the subband 706b as indicated by an "X" mark 716 in the CCA 712.

In some examples, the BS transmits in the SDL licensed band 702 to the UE, a first DL communication signal indicating the information 708 associated with the TXOP 704 in the primary DL unlicensed band 706. In the example illustrated in FIG. 7, the information 708 indicates subband channel access information for the primary DL unlicensed band 706. The BS may provision certain resources on the SDL licensed band 702 to indicate which subbands passed LBT and/or which subbands failed LBT for the primary DL unlicensed band 706. A subband is considered to have passed LBT if the BS performed a LBT on the subband and the LBT resulted in a LBT pass. A subband is considered to have failed LBT if the BS performed a LBT on the subband and the LBT resulted in a LBT fail.

The BS may provide the information 708 to the UE after the subband 706a passes LBT and/or after the subband 706b fails LBT. In an example, the information 708 includes subband channel access information, which may include a list of one or more unlicensed subbands of the plurality of unlicensed subbands in which performing the LBT results in a LBT pass and/or a list of one or more unlicensed subbands of the plurality of unlicensed subbands in which performing the LBT results in a LBT fail. Additionally, the BS transmits in the subband 706a, a second DL communication signal during the TXOP 704. In an example, the BS transmits DL data via a PDSCH and/or DL control information via a PDCCH to the UE.

The UE receives in the SDL licensed band 702, the information 708 and accordingly is informed of the subband(s) to which the BS was able to and/or not able to gain access, which each depends on the outcome of the CCA 710, 712 (e.g., LBT pass or LBT fail). Based on the information 708, the UE may search the subband 706a for the second DL communication signal transmitted by the BS during the TXOP 704 and may determine to not search the subband 706b for a time period (or until the UE receives a subsequent indication that the BS was able to gain access and reserve a TXOP in the subband 706b). The UE receives in the subband 706a the DL data from the BS.

In the absence of any indication from the secondary component carrier, the UE performs a blind search for detecting signals in both the subbands 706a and 706b to determine whether the primary component carrier is transmitting in any one of these subbands. By utilizing the SDL licensed band 702 to transmit the information 708, the BS may provide the UE with certainty regarding which subband passed and/or failed LBT in the primary DL unlicensed band 706. In this way, the UE's search may be simplified and the UE may consume less power.

Figure 8:
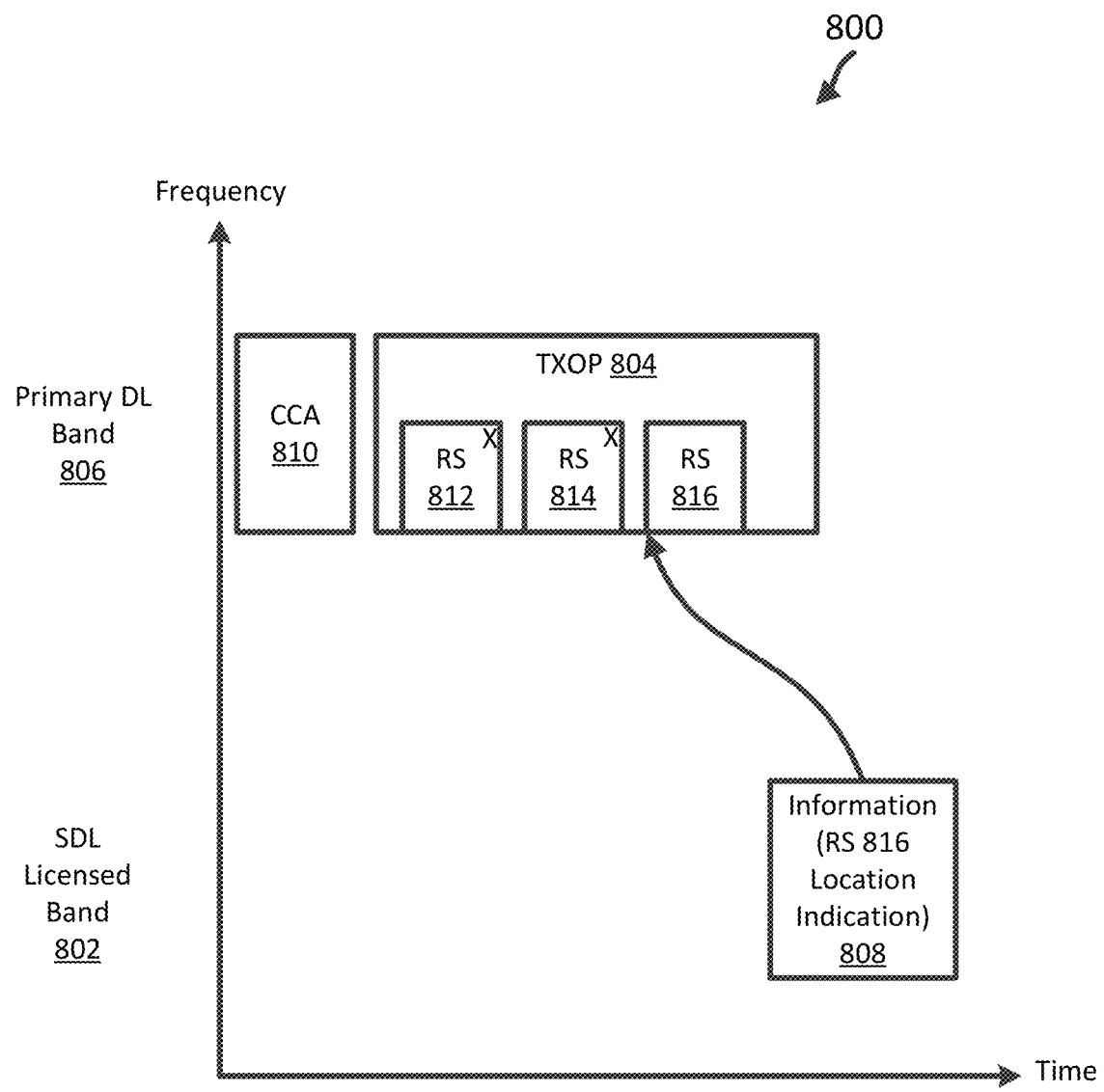
FIG. 8 illustrates a communication scheme in which the BS leverages use of the SDL licensed band for indicating a location of a reference signal in the primary DL band according to one or more embodiments of the present disclosure.

FIG. 8 illustrates a communication scheme 800 in which the BS leverages use of a SDL licensed band 802 for indicating a location of a reference signal 816 in a primary DL band 806 according to one or more embodiments of the present disclosure. In an example, the primary DL band 806 is licensed band. In another example, the primary DL band 806 is unlicensed band. In this example, to transmit DL data in the primary DL band 806, access by the BS is preceded by a CCA 810 to detect whether the BS can reserve the unlicensed medium for data transmission.

After a LBT pass in the primary DL band 806, the BS transmits in the primary DL band 806 to the UE, reference signals 812, 814, and 816 during the TXOP 804. A reference signal may include a predetermined signal sequence or pilot symbols. The BS may transmit reference signals on an ad hoc basis rather than in a deterministic fashion that can be mapped by the UE. For example, the BS may desire to transmit to the UE, UE-specific reference signals at different instances of time within the TXOP 804 and/or across different TXOPs. One or more of the reference signals may be used by the UE for measurements. After the BS transmits the reference signals 812, 814, and 816, the BS transmits in the SDL licensed band 802, a communication signal indicating information 808 associated with the TXOP 804 in the primary DL band 806. The locations of reference signals 812 and 814 are potential candidates for transmission of reference signals. The locations of reference signals 812 and 814 are marked with an "X" to highlight that in some examples, the BS does not send reference signals in those locations. In an example, the reference signal 816 is specific to the UE, and the information 808 indicates the location of the reference signal 816 (e.g., time where the reference signal 816 was transmitted in the primary DL band 806) in the TXOP 804. The BS may provision certain resources on the SDL licensed band 802 to indicate the reference signal location. It should be understood that the information 808 may indicate one or more reference signal locations within the TXOP 804.

In an example, the information 808 may indicate the information associated with reference signal transmissions that can be used for radio resource management (RRM) and/or radio link monitoring (RLM) measurements. The RRM in NR is based on measurements of reference signals and can be reported with metrics such as received signal strength indication (RSSI), reference signal received power (RSRP), reference signal received quality (RSRQ), and signal-to-interference-noise-ratio (SINR). Similarly, reference signal based RLM is also supported.

The UE receives in the SDL licensed band 802, the communication signal indicating the information 808 and accordingly is informed of the location of the reference signal 816, which depends on the outcome of the CCA 810 (e.g., LBT pass or LBT fail). Based on the information 808, the UE may be able to search in the primary DL band 806 at specific locations during the TXOP 804 for the reference signal 816 transmitted by the BS.

In some examples, the primary DL band 806 and the SDL licensed band 802 are licensed spectrum, and a cross carrier indication of the location of reference signals may inform the UE to measure certain reference signals in at least one of the primary bands. In an example, the UE receives in the SDL licensed band 802, an indication signal including the information 808 and searches for the reference signal 816 in accordance with the location included in the information 808. The UE may experience poorer performance in the primary DL band 806 than the SDL licensed band 802. In this example, the SDL licensed band 802 may be more reliable in terms of indicating which reference signals the UE should measure. If the UE experiences a stronger signal with the SDL licensed band 802 compared to the primary DL band 806 and indicates such information in a measurement report to the BS, the BS may switch from the primary DL band 806 to the SDL licensed band 802 for transmission of data. In this example, the BS may transmit in the primary DL band 806 the information 808 to the UE and transmit in the SDL licensed band 802 the reference signals. Accordingly, the BS may transmit the information 808 using the primary DL band 806 or the SDL licensed band 802, and switch between the two carriers.

Figure 9:
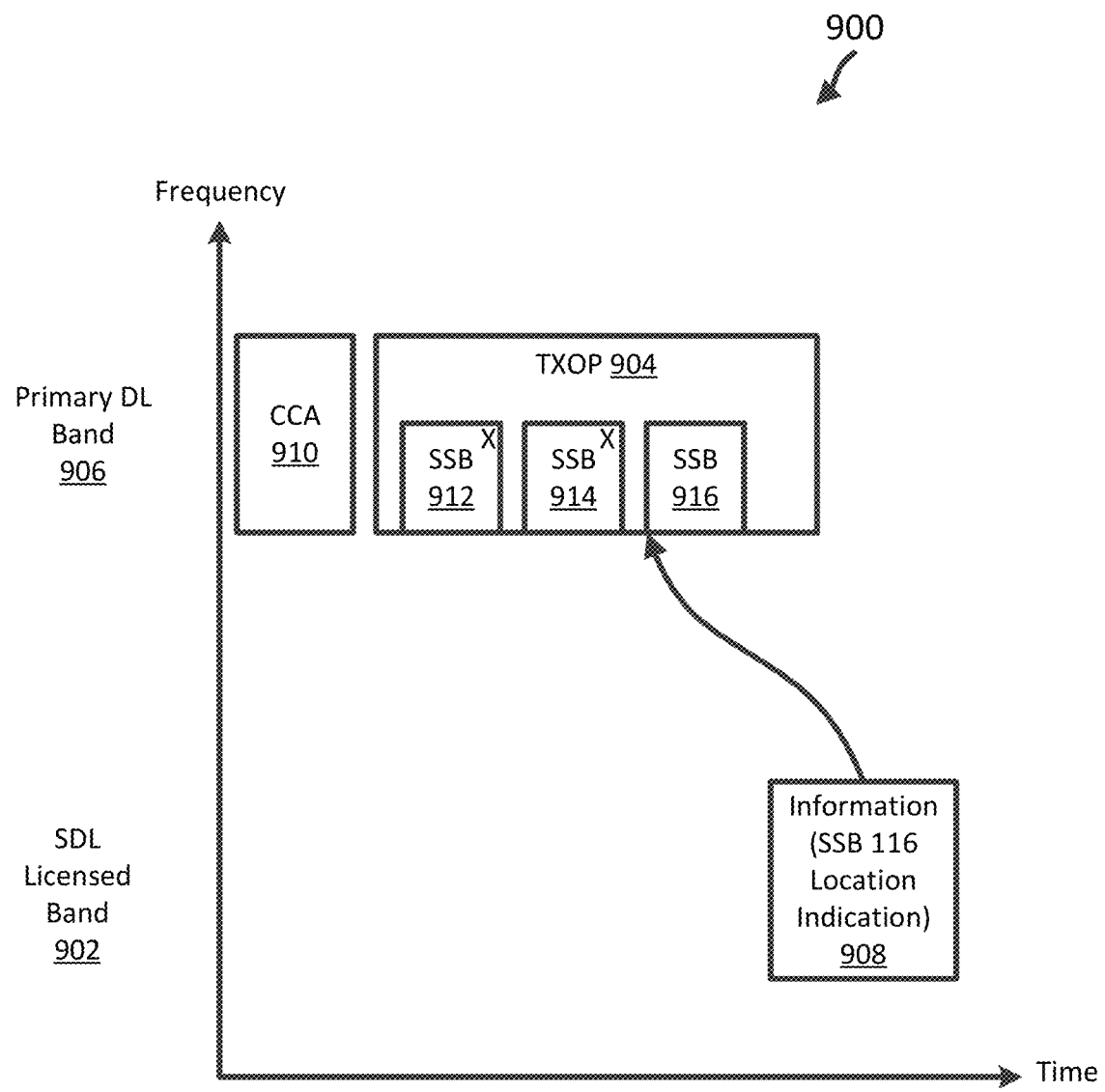
FIG. 9 illustrates a communication scheme in which the BS leverages use of the SDL licensed band for indicating a location of a synchronization signal block (SSB) in a primary DL band according to one or more embodiments of the present disclosure.

FIG. 9 illustrates a communication scheme 900 in which the BS leverages use of a SDL licensed band 902 for indicating a location of a SSB in a primary DL band 906 according to one or more embodiments of the present disclosure. In an example, the primary DL band 906 is licensed band. In another example, the primary DL band 906 is unlicensed band. In this example, to transmit DL data in the primary DL band 906, access by the BS is preceded by a CCA 910 to detect whether the BS can reserve the unlicensed medium for data transmission.

After a LBT pass in the primary DL band 906, the BS transmits in the primary DL band 906 to the UE, SSBs 912, 914, and 916 during the TXOP 904. One or more SSBs may be used by the UE for measurements. The locations of SSBs 912 and 914 are potential candidates for transmission of SSBs. The locations of SSBs 912 and 914 are marked with an "X" to highlight that in some examples, the BS does not send SSBs in those locations. After the BS transmits the SSBs 912, 914, and 916, the BS transmits in the SDL licensed band 902, a communication signal indicating information 908 associated with the TXOP 904 in the primary DL band 906. In an example, the information 908 indicates the location of the SSB 916 (e.g., time where the SSB 916 was transmitted in the primary DL band 906) in the TXOP 904. The BS may provision certain resources on the SDL licensed band 902 to indicate the SSB location within the TXOP 904 and the indication may be transmitted using a group common PDCCH in the SDL licensed band 902. It should be understood that the information 908 may indicate one or more SSB locations within the TXOP 904.

The UE receives in the SDL licensed band 902, the communication signal indicating the information 908 and accordingly is informed of the location of the SSB 816, which depends on the outcome of the CCA 910 (e.g., LBT pass or LBT fail). Based on the information 908, the UE may be able to search in the primary DL band 906 at specific locations during the TXOP 904 for the SSB 916 transmitted by the BS.

Without the information 808 (e.g., reference signal location indication) or information 908 (e.g., SSB location indication) provided in the SDL licensed band, the UE performs a blind search in the primary DL band 906 for the particular reference signal or SSB, respectively. The transmission and thus location of the reference signal or SSB within the TXOP depends on the outcome of the CCA. By utilizing the SDL licensed band to transmit the information 808 or information 980, the BS may provide the UE with the particular location of the reference signal or SSB, respectively. In this way, the UE's search may be simplified and the UE may consume less power. Additionally, if the SDL licensed band is on the mmWave frequency band compared to the sub-6 frequency band, better time-domain granularity of the particular signal (e.g., reference signal or SSB) may be provided, and the UE may be able to pinpoint more accurately the location of the particular signal within the TXOP.

In FIG. 9, the information 908 may provide for a cross carrier indication of the location of SSBs. The BS performs LBT in the primary DL band 906 and reserves the TXOP 904 for transmission of the SSBs 912, 914, and 916. After reservation of the TXOP 904, the BS is aware that it will start transmitting in the primary DL band 906 the SSBs 912, 914, and 916 and may accordingly transmit the information 908 indicating the location of the SSB 916 within the TXOP 904. The BS may send in the SDL licensed band 902 the indication at about the same time as when the LBT in the primary DL band 906 results in a LBT pass. In the example illustrated in FIG. 9, the information 908 indicating the location of the SSB 916 arrives after the BS has started transmitting the SSB 916. In this example, the UE may have already started the blind detection process of searching for the SSB 916 because at this point, the UE may be unaware of the SSB 916's location. When the UE receives the information 908, it may assist the UE in processing the TXOP quicker and finding the SSB 916.

Figure 10:
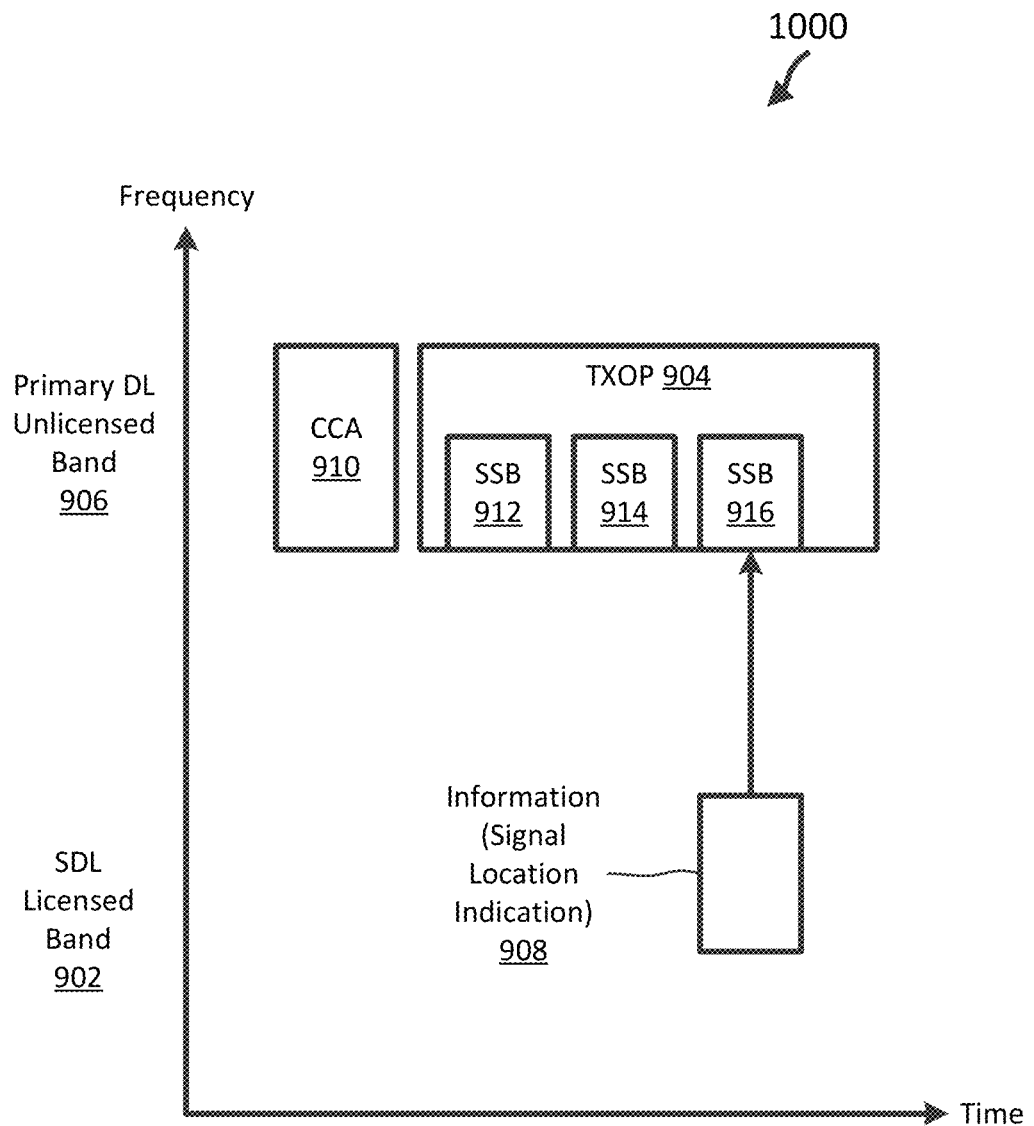
FIG. 10 illustrates a communication scheme in which the BS leverages use of the SDL licensed band for indicating a location of a SSB in a primary DL band according to one or more embodiments of the present disclosure.

In another example, the information indicating the SSB location(s) may be time-aligned to the transmissions of the SSB(s) in the primary DL band. The time alignment of indication information in licensed SDL with the transmitted SSB in unlicensed DL may assist the UE in locating the SSB without the need for buffering all the information. FIG. 10 illustrates a communication scheme 1000 in which the BS leverages use of the SDL licensed band 902 for indicating a location of a SSB in the primary DL band 1006 according to one or more embodiments of the present disclosure. In the example illustrated in FIG. 10, the information 1008 indicating the location of the SSB 916 is time-aligned to the transmission of the SSB 916 in the primary DL band 906. In this time-alignment example, the UE may use the indication to determine whether to measure signal quality of one or more SSBs (e.g., SSB 916). The UE may determine signal quality measurements of the SSBs and may transmit the measurement report for the SDL licensed band 902 based on the SSB location(s) indicated in the information 1008. For example, the measurements may be RSSI, RSRQ, RSRP, or SINR, and the UE may include the measurements in a measurement report to the BS. In an example, the UE transmits the measurement report for the SDL licensed band 902 based on the SSB location indicated in the information 1008. The UE may perform a RRC procedure to obtain the signal quality measurements, which may also provide information on neighboring cell measurements and cell (re-)selection. The BS may determine whether the radio link is still healthy based on the measurements.

If a UE's capabilities are such that the UE is unable to perform measurements of the SSB(s) in the primary DL band 906 and also transmit in the primary DL band 906 at the same time, the UE may search for the SSB(s) within the TXOP, in accordance with the SSB location(s) included in the information 1008. The BS may transmit the information 1008 in a time-aligned manner to a set of UEs having the capability to perform measurements of the SSB(s) in the primary DL band 906 and also transmit in the primary DL band 906 at the same time and may transmit the information 1008 after transmitting the SSBs to a set of UEs that do not have the aforementioned capability. Additionally, a UE's capabilities may depend on the location of the frequency band and the hardware components on the analog/RF chains. For example, if the primary DL band 906 is the sub-6 frequency band and the SDL licensed band 902 is the mmWave frequency band, the UE may be able to perform measurements of the SSB(s) in the primary DL band 906 and may also transmit in the primary DL band 906 at the same time.

Figure 11:
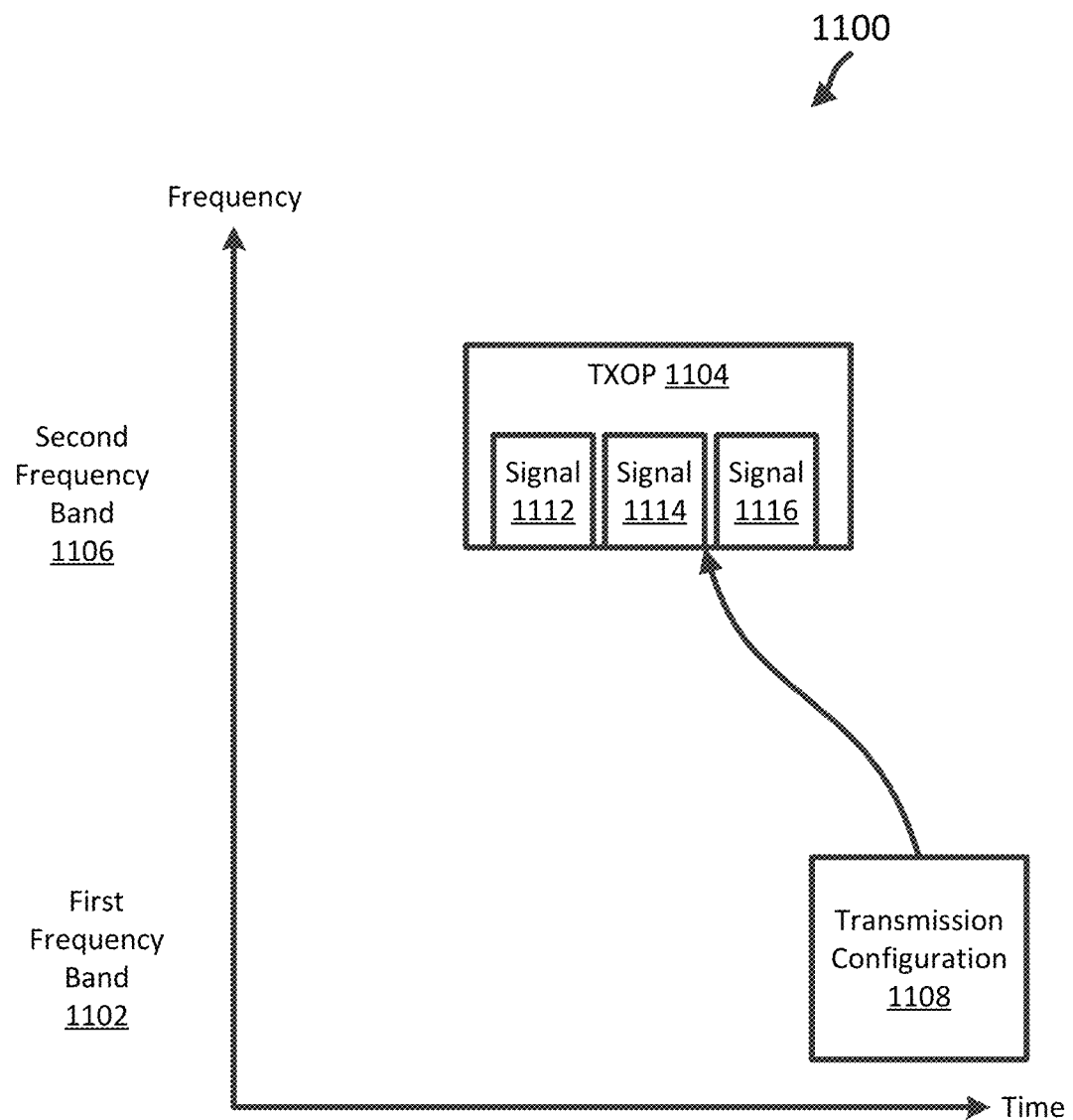
FIG. 11 illustrates a communication scheme in which the BS indicates a transmission configuration for a signal according to one or more embodiments of the present disclosure.

FIG. 11 illustrates a communication scheme 1100 in which the BS indicates a transmission configuration for a signal according to one or more embodiments of the present disclosure. In FIG. 11, the communication scheme 1100 may be employed by BSs such as BSs 105, 205, 400 and UEs such as the UEs 115, 215, 500 in a network such as the network 100. Additionally, the x-axis represents time in some constant units, and the y-axis represents frequency in some constant units.

The BS may transmit in a second frequency band 1106, signals 1112, 1114, and 1116 during a TXOP 1104. In some examples, the BS transmits in a first frequency band 1102 to the UE, a first communication signal indicating a transmission configuration 1108 for a given signal (e.g., signal 1112, signal 1114, and/or signal 1116) in the second frequency band 1106. The given signal may be, for example, a reference signal or a network information signal. The first communication signal may indicate the transmission configuration 1108 for at least one of a reference signal or a network information signal (e.g., SSB). The BS transmits in the second frequency band 1106 based on the first communication signal, the given signal (e.g., reference signal or a network information signal).

At least one of the first frequency band 1102 and the second frequency band 1106 may be licensed spectrum. In an example, both the first frequency band 1102 and the second frequency band 1106 are licensed spectrum. In another example, the primary component carrier operates in the secondary frequency band 1106, and the secondary component carrier operates in the first frequency band 1102.

Figure 12:
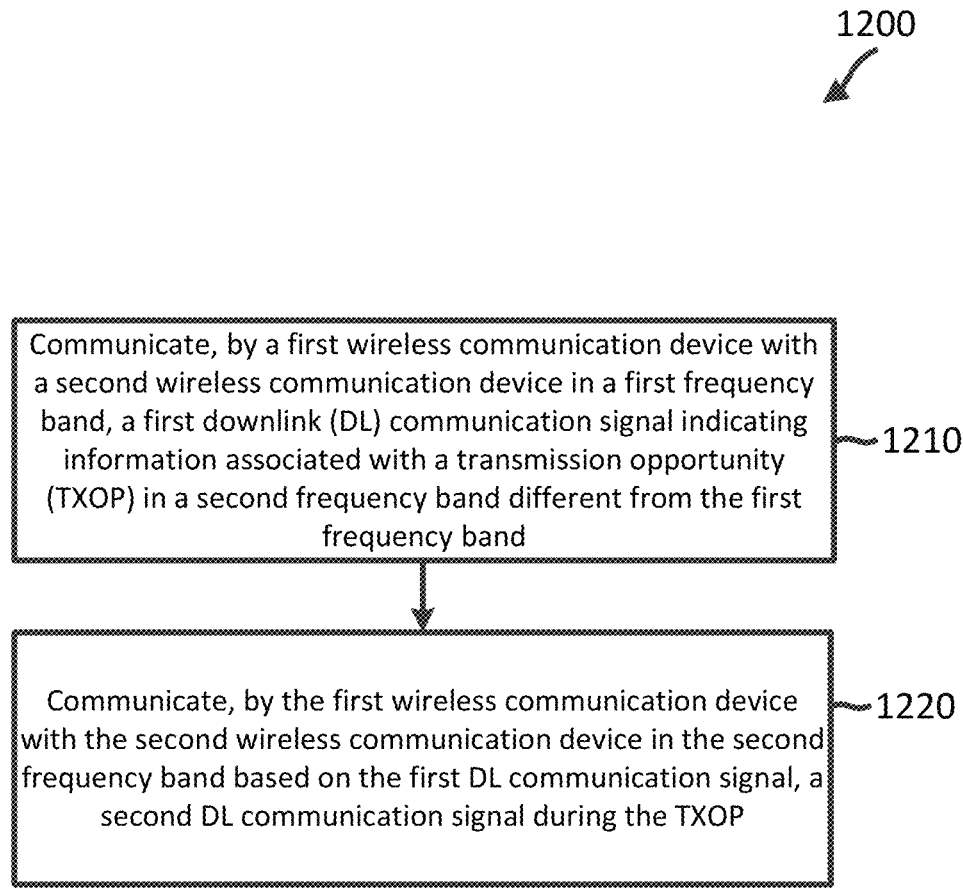
FIG. 12 is a flow diagram of communicating information associated with a TXOP in a communication method according to one or more embodiments of the present disclosure.

FIG. 12 is a flow diagram of communicating information associated with a TXOP in a communication method 1200 according to one or more embodiments of the present disclosure. Steps of the method 1200 can be executed by a computing device (e.g., a processor, processing circuit, and/or other suitable component) of a wireless communication device, such as the BSs 105, 205, and 400 and the UEs 115, 215, and 500 or other suitable means for performing the steps. In some examples, a wireless communication device, such as the BS 105, BS 205, or BS 400, may utilize one or more components, such as the processor 402, the memory 404, the TXOP indication module 408, the transmission configuration module 409, the transceiver 410, the modem subsystem 412, the RF unit 414, and the one or more antennas 416, to execute the steps of method 1200. In some examples, a wireless communication device, such as the UE 115, UE 215, or UE 500, may utilize one or more components, such as the processor 502, the memory 504, the TXOP indication module 508, the transmission configuration module 509, the transceiver 510, the modem subsystem 512, the RF unit 514, and the one or more antennas 516, to execute the steps of method 1200. The method 1200 may employ similar mechanisms as in the schemes 600, 700, 800, 900, and 1000 described above with respect to FIGS. 6, 7, 8, 9, and 10 respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes communicating, by a first wireless communication device with a second wireless communication device in a first frequency band, a first DL communication signal indicating information associated with a TXOP in a second frequency band different from the first frequency band. In an example, the first frequency band is a SDL licensed band, and the second frequency band is a primary DL unlicensed band. The information may include, for example, a start of the TXOP, location(s) of reference signal(s) transmitted during the TXOP, location(s) of SSB(s) transmitted during the TXOP. Additionally, if the second frequency band is partitioned into a plurality of subbands, the BS may perform LBT on the plurality of subbands. In this example, the information may include a LBT result for one or more subbands of the plurality of subbands (e.g., LBT pass and/or LBT fail).

At step 1220, the method 1200 includes communicating, by the first wireless communication device with the second wireless communication device in the second frequency band based on the first DL communication signal, a second DL communication signal during the TXOP.

In an example, the first wireless communication device may correspond to a BS and the second wireless communication device may correspond to a UE. In this example, the BS may transmit (e.g., in SDL licensed band) to the UE, the first and second communication signals in different frequency bands. In another example, the first wireless communication device may correspond to a UE and the second wireless communication device may correspond to a BS. In this example, the UE may receive from the BS, the first and second communications in different frequency bands.

Figure 13:
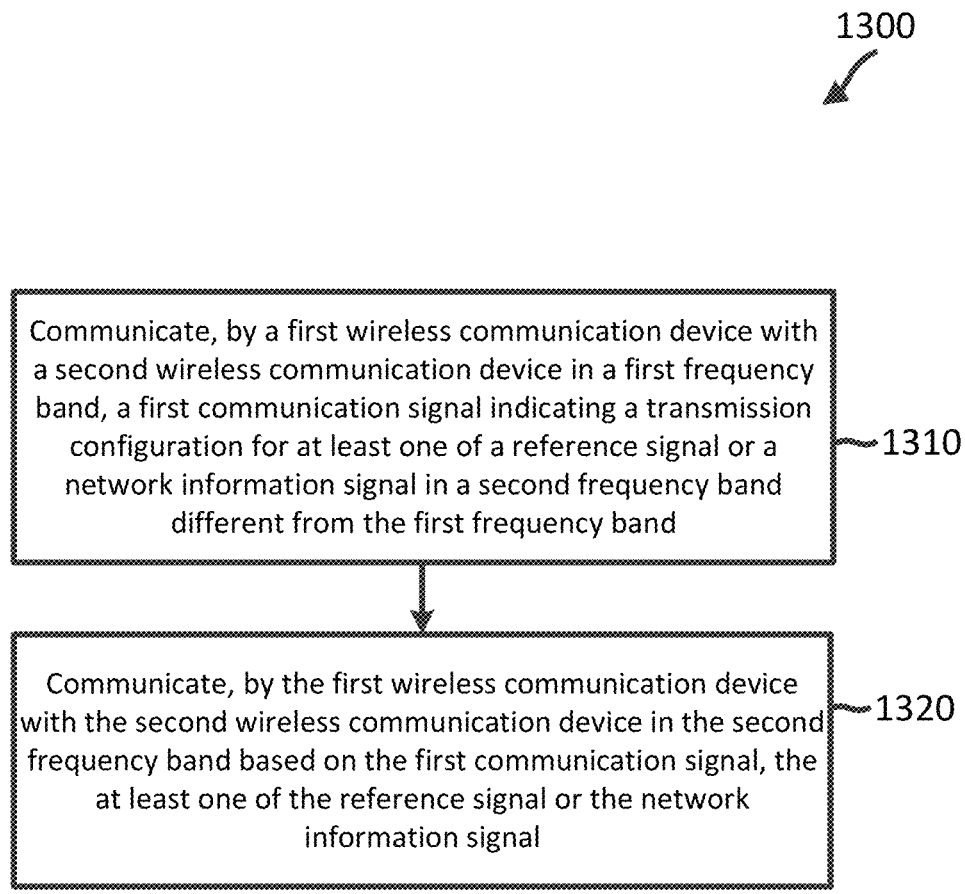
FIG. 13 is a flow diagram of communicating a transmission configuration in a communication method according to one or more embodiments of the present disclosure.

FIG. 13 is a flow diagram of communicating a transmission configuration in a communication method 1300 according to one or more embodiments of the present disclosure. Steps of the method 1300 can be executed by a computing device (e.g., a processor, processing circuit, and/or other suitable component) of a wireless communication device, such as the BSs 105, BS 205, and 400 and the UEs 115, UE 215, and 500 or other suitable means for performing the steps. In some examples, a wireless communication device, such as the BS 105, BS 205, or BS 400, may utilize one or more components, such as the processor 402, the memory 404, the TXOP indication module 408, the transmission configuration module 409, the transceiver 410, the modem subsystem 412, the RF unit 414, and the one or more antennas 416, to execute the steps of method 1300. In some examples, a wireless communication device, such as the UE 115, UE 215, or UE 500, may utilize one or more components, such as the processor 502, the memory 504, the TXOP indication module 508, the transmission configuration module 509, the transceiver 510, the modem subsystem 512, the RF unit 514, and the one or more antennas 516, to execute the steps of method 1300. The method 1300 may employ similar mechanisms as in the schemes 1100 described above with respect to FIG. 11. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1200 includes communicating, by a first wireless communication device with a second wireless communication device in a first frequency band, a first communication signal indicating a transmission configuration for at least one of a reference signal or a network information signal in a second frequency band different from the first frequency band. In some examples, the first frequency band is a SDL licensed band, and the second frequency band is a primary licensed band. In some examples, the first and second frequency bands are licensed spectrum. In some examples, a primary component carrier operates in the second frequency band, and a secondary component carrier operates in the first frequency band. Additionally, the network information signal may include one or more SSBs. The transmission configuration may include a location of one or more reference signals transmitted during a TXOP in the second frequency band and/or a location of one or more network information signals transmitted during the TXOP.

At step 1320, the method 1300 includes communicating, by the first wireless communication device with the second wireless communication device in the second frequency band based on the first communication signal, the at least one of the reference signal or the network information signal.

In some examples, the first wireless communication device may correspond to a BS and the second wireless communication device may correspond to a UE. In an example, the BS transmits to the UE, the first communication signal indicating a transmission configuration for a reference signal and the actual reference signal. In another example, the BS transmits to the UE, the first communication signal indicating a transmission configuration for a network information signal and the actual network information signal.

In some examples, the first wireless communication device may correspond to a UE and the second wireless communication device may correspond to a BS. In an example, the UE receives from the BS, the first communication signal indicating the transmission configuration for a reference signal and the actual reference signal. In another example, the UE receives from the BS, the first communication signal indicating the transmission configuration for a network information signal and the actual network information signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including: communicating, by a first wireless communication device with a second wireless communication device in a first frequency band, a first DL communication signal indicating information associated with a TXOP in a second frequency band different from the first frequency band; and communicating, by the first wireless communication device with the second wireless communication device in the second frequency band based on the first DL communication signal, a second DL communication signal during the TXOP.

In some examples, the first frequency band is a secondary DL licensed frequency band, and the second frequency band is a primary DL unlicensed band. In some examples, the method includes performing, by the first wireless communication device, a LBT in the second frequency band, where the information is dependent on a result of the LBT. In some examples, the information includes a start of the TXOP in the second frequency band. In some examples, the second frequency band is partitioned into a plurality of subbands, and the information includes subband channel access information for the second frequency band. In some examples, the method includes performing, by the first wireless communication device, a LBT in each subband of the plurality of subbands, where the subband channel access information includes a list of one or more unlicensed subbands of the plurality of subbands in which performing the LBT results in a LBT pass. In some examples, the method includes performing, by the first wireless communication device, a LBT in each subband of the plurality of subbands, where the subband channel access information includes a list of one or more unlicensed subbands of the plurality of subbands in which performing the LBT results in a LBT fail.

In some examples, the information includes a location of a reference signal transmitted during the TXOP in the second frequency band. In some examples, the method includes communicating, by the first wireless communication device with the second wireless communication device, a measurement report including a signal quality measurement of the reference signal. In some examples, the information includes a location of a SSB transmitted during the TXOP in the second frequency band. In some examples, the method includes communicating, by the first wireless communication device with the second wireless communication device, a measurement report including a signal quality measurement of the SSB. In some examples, the signal quality measurement is at least one of RSSI, RSRP, RSRQ, or SINR.

Further embodiments of the present disclosure include a method of wireless communication, including a method of wireless communication, including: communicating, by a first wireless communication device with a second wireless communication device in a first frequency band, a first communication signal indicating a transmission configuration for at least one of a reference signal or a network information signal in a second frequency band different from the first frequency band; and communicating, by the first wireless communication device with the second wireless communication device in the second frequency band based on the first communication signal, the at least one of the reference signal or the network information signal.

In some examples, the first and second frequency bands are licensed spectrum. In some examples, a primary component carrier operates in the second frequency band, and a secondary component carrier operates in the first frequency band. In some examples, a primary component carrier operates in the first frequency band, and a secondary component carrier operates in the second frequency band. In some examples, the network information signal includes a SSB. In some examples, the transmission configuration includes a location of one or more reference signals transmitted during a TXOP in the second frequency band. In some examples, the transmission configuration includes a location of one or more network information signals transmitted during a TXOP in the second frequency band.

Further embodiments of the present disclosure include an apparatus including a transceiver configured to: communicate, by a first wireless communication device with a second wireless communication device in a first frequency band, a first DL communication signal indicating information associated with a TXOP in a second frequency band different from the first frequency band; and communicate, by the first wireless communication device with the second wireless communication device in the second frequency band based on the first DL communication signal, a second DL communication signal during the TXOP.

In some examples, the apparatus includes a processor configured to perform a LBT in the second frequency band. In some examples, the information includes a start of the TXOP. In some examples, the second frequency band is partitioned into a plurality of subbands, and wherein the information includes subband channel access information for the second frequency band. In some examples, the apparatus includes a processor configured to perform a LBT in each subband of the plurality of subbands, where the subband channel access information includes a list of one or more unlicensed subbands of the plurality of subbands in which performing the LBT results in a LBT pass. In some examples, the apparatus includes a processor configured to perform a LBT in each subband of the plurality of subbands, where the subband channel access information includes a list of one or more unlicensed subbands of the plurality of subbands in which performing the LBT results in a LBT fail.

Further embodiments of the present disclosure include an apparatus including a transceiver configured to: communicate, by a first wireless communication device with a second wireless communication device in a first frequency band, a first communication signal indicating a transmission configuration for at least one of a reference signal or a network information signal in a second frequency band different from the first frequency band; and communicate, by the first wireless communication device with the second wireless communication device in the second frequency band based on the first communication signal, the at least one of the reference signal or the network information signal.

In some examples, the first and second frequency bands are licensed spectrum. In some examples, a primary component carrier operates in one of the first frequency band or the second frequency band, and a secondary component carrier operates in the other one of the first frequency band or the second frequency band. In some examples, the transmission configuration includes a location of one or more reference signals transmitted during a TXOP in the second frequency band. In some examples, the transmission configuration includes a location of one or more network information signals transmitted during a TXOP in the second frequency band.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device in a first frequency band, a first downlink (DL) communication signal including an indication of whether a transmission opportunity (TXOP) in at least one subband of a second frequency band has been reserved, the second frequency band being different from the first frequency band; and
   communicating, by the first wireless communication device with the second wireless communication device in the second frequency band based on the first DL communication signal, a second DL communication signal during the TXOP.

2. The method of claim 1, wherein the first frequency band is a secondary DL licensed frequency band, and the second frequency band is a primary DL unlicensed band.

3. The method of claim 1, further comprising:
   performing, by the first wireless communication device, a listen-before-talk (LBT) in the second frequency band, wherein the indication is dependent on a result of the LBT.

4. The method of claim 1, wherein the first DL communication signal indicates a start of the TXOP in the second frequency band.

5. The method of claim 1, wherein the second frequency band is partitioned into a plurality of subbands, and wherein the first DL communication signal indicates subband channel access information for the second frequency band.

6. The method of claim 5, further comprising:
   performing, by the first wireless communication device, a LBT in each subband of the plurality of subbands, wherein the subband channel access information includes a list of one or more unlicensed subbands of the plurality of subbands in which performing the LBT results in a LBT pass or a LBT fail.

7. The method of claim 1, wherein the communicating the first DL communication signal comprises communicating the first DL communication signal via a group common DL control channel.

8. The method of claim 1, wherein the first DL communication signal indicates a location of a reference signal transmitted during the TXOP in the second frequency band.

9. The method of claim 8, further comprising:
   communicating, by the first wireless communication device with the second wireless communication device, a measurement report including a signal quality measurement of the reference signal.

10. The method of claim 1, wherein the first DL communication signal indicates a location of a synchronization signal block (SSB) transmitted during the TXOP in the second frequency band.

11. The method of claim 10, further comprising:
    communicating, by the first wireless communication device with the second wireless communication device, a measurement report including a signal quality measurement of the SSB.

12. The method of claim 11, wherein the signal quality measurement is at least one of received signal strength indication (RSSI), reference signal received power (RSRP), reference signal received quality (RSRQ), or signal-to-interference-noise-ratio (SINR).

13. A method of wireless communication, comprising:
communicating, by a first wireless communication device with a second wireless communication device in a first frequency band, a first communication signal indicating a transmission of a reference signal in a second frequency band different from the first frequency band; and
communicating, by the first wireless communication device with the second wireless communication device in the second frequency band based on the first communication signal, the reference signal.

14. The method of claim 13, wherein the first and second frequency bands are licensed spectrum.

15. The method of claim 13, wherein a primary component carrier operates in the second frequency band, and wherein a secondary component carrier operates in the first frequency band.

16. The method of claim 13, wherein a primary component carrier operates in the first frequency band, and wherein a secondary component carrier operates in the second frequency band.

17. The method of claim 13, wherein the first communication signal indicates a location of one or more reference signals transmitted during a TXOP in the second frequency band.

18. The method of claim 13, wherein the first communication signal indicates a transmission of a network information signal in the second frequency band, the method further comprising:
communicating, by the first wireless communication device with the second wireless communication device in the second frequency band based on the first communication signal, the network information signal.

19. The method of claim 18, wherein the network information signal includes a synchronization signal block (SSB).

20. The method of claim 18, wherein the first communication signal indicates a location of one or more network information signals transmitted during a TXOP in the second frequency band.

21. An apparatus comprising:
a transceiver configured to:
communicate, by a first wireless communication device with a second wireless communication device in a first frequency band, a first downlink (DL) communication signal including an indication of whether a transmission opportunity (TXOP) in at least one subband of a second frequency band has been reserved, the second frequency band being different from the first frequency band; and
communicate, by the first wireless communication device with the second wireless communication device in the second frequency band based on the first DL communication signal, a second DL communication signal during the TXOP.

22. The apparatus of claim 21, further comprising:
a processor configured to perform a LBT in the second frequency band.

23. The apparatus of claim 21, wherein the first DL communication signal indicates a start of the TXOP.

24. The apparatus of claim 21, wherein the second frequency band is partitioned into a plurality of subbands, and wherein the first DL communication signal indicates subband channel access information for the second frequency band.

25. The apparatus of claim 24, further comprising:
a processor configured to perform a LBT in each subband of the plurality of subbands, wherein the subband channel access information includes a list of one or more unlicensed subbands of the plurality of subbands in which performing the LBT results in a LBT pass or a LBT fail.

26. The apparatus of claim 21, wherein the transceiver configured to communicate the first DL communication signal is further configured to communicate the first DL communication signal via a group common DL control channel.

27. An apparatus comprising:
a transceiver configured to:
communicate, by a first wireless communication device with a second wireless communication device in a first frequency band, a first communication signal indicating a transmission of a reference signal in a second frequency band different from the first frequency band; and
communicate, by the first wireless communication device with the second wireless communication device in the second frequency band based on the first communication signal, the reference signal.

28. The apparatus of claim 27, wherein the first and second frequency bands are licensed spectrum.

29. The apparatus of claim 27, wherein a primary component carrier operates in one of the first frequency band or the second frequency band, and wherein a secondary component carrier operates in the other one of the first frequency band or the second frequency band.

30. The apparatus of claim 27, wherein the first communication signal indicates a location of one or more reference signals transmitted during a TXOP in the second frequency band.

* * * * *